US008100678B2

(12) United States Patent
Kuwabara et al.

(10) Patent No.: US 8,100,678 B2
(45) Date of Patent: Jan. 24, 2012

(54) TIRE VULCANIZING MACHINE

(75) Inventors: Hideaki Kuwabara, Kobe (JP); Kazuto Okada, Kobe (JP); Hisashi Mitamura, Takasago (JP); Tomomichi Murata, Takasago (JP); Masatake Toshima, Kobe (JP); Yasuhiko Fujieda, Takasago (JP)

(73) Assignee: Kobe Steel, Ltd., Hyogo (JP)

( * ) Notice: Subject to any disclaimer, the term of this patent is extended or adjusted under 35 U.S.C. 154(b) by 200 days.

(21) Appl. No.: 12/448,940

(22) PCT Filed: Jan. 24, 2008

(86) PCT No.: PCT/JP2008/050968
§ 371 (c)(1),
(2), (4) Date: Jul. 16, 2009

(87) PCT Pub. No.: WO2008/093591
PCT Pub. Date: Aug. 7, 2008

(65) Prior Publication Data
US 2010/0068320 A1    Mar. 18, 2010

(30) Foreign Application Priority Data

Jan. 30, 2007    (JP) .................................. 2007-019120

(51) Int. Cl.
*B29C 35/02*    (2006.01)
(52) U.S. Cl. .......................................... 425/36; 425/42
(58) Field of Classification Search .................... 425/36, 425/42; 249/111
See application file for complete search history.

(56) References Cited

U.S. PATENT DOCUMENTS

| | | | |
|---|---|---|---|
| 2,451,992 A | 10/1948 | Te Grotenhuis | |
| 3,329,748 A * | 7/1967 | Hugger | 425/42 |
| 4,695,234 A | 9/1987 | Amano et al. | |
| 5,020,982 A * | 6/1991 | Kubota et al. | 425/42 |
| 5,683,643 A | 11/1997 | Laurent | |
| 7,435,069 B2 | 10/2008 | Okada et al. | |

FOREIGN PATENT DOCUMENTS

| JP | 64-1906 | * 1/1989 |
|---|---|---|
| JP | 07-329066 | 6/1995 |
| JP | 2005-22399 | 3/2004 |

OTHER PUBLICATIONS

International Search Report of PCT/JP2008/50968 mailed Feb. 19, 2008.
EP Patent Office Extended European Search Report for Application No./Patent No. 08703796.6-2307/2127841 PT/JP2008050968, dated Jul. 4, 2011.

* cited by examiner

*Primary Examiner* — James Mackey
(74) *Attorney, Agent, or Firm* — Stites & Harbison PLLC; Juan Carlos A. Marquez, Esq.

(57) ABSTRACT

It is an object of the present invention to prevent or suppress the occurrence of a temperature difference between upper and lower portions of a green tire in a vulcanizing process carried out by a tire vulcanizing machine 1 and thereby stabilize the tire quality. The tire vulcanizing machine 1 comprises a tire vulcanizing bladder 20 disposed inside a green tire 4, a jet section 90 for jetting a heating/pressurizing medium to the interior of the bladder 20, a medium supply path for supplying the heating/pressurizing medium to the jet section 90, and a holding section 14 for holding an edge portion of the bladder 20, the edge portion being located on the side close to the medium supply path. Further, there are disposed heat insulators 7, 11, 8 and 6 so as to suppress the transfer of heat from the heating/pressurizing medium jetted from the jet section 90, to a lower edge portion of the green tire 4.

9 Claims, 2 Drawing Sheets

TIRE VULCANIZING MACHINE

FIELD OF ART

The present invention relates to a tire vulcanizing machine. More particularly, the present invention is concerned with a tire vulcanizing machine capable of preventing the occurrence of a temperature difference depending on portions of a tire at the time of vulcanizing/molding and thereby stabilizing the quality of the tire.

BACKGROUND ART

A bladder type tire vulcanizing machine has heretofore been known. In this type of a tire vulcanizing machine, a bladder is installed inside a green tire set within a mold. The bladder is an elastic diaphragm for the transfer of fluid pressure and is composed of a material (e.g., butyl rubber) having elasticity. It is capable of expansion and contraction. A heating/pressurizing medium such as steam or high-temperature gas (e.g., inert gas such as nitrogen, or air) is supplied to the interior of the bladder. As a result of this supply, the bladder expands and presses the green tire against the mold. Further, the heating/pressurizing medium and the mold heated by the heating/pressurizing medium heat the green tire from both inside and outside of the tire, thereby vulcanizing the green tire.

In connection with such a bladder type tire vulcanizing machine, the technique disclosed in Patent Literature 1 or 2 has heretofore been known.

In Patent Literature 1 there is disclosed a tire vulcanizing machine for heating the aforesaid heating/pressurizing medium at a high heat exchange rate. This conventional tire vulcanizing machine is provided with jet means for jetting a heating/pressurizing medium for vulcanizing/molding of a green tire to the interior of a bladder and is also provided with means for heating the heating/pressurizing medium at a high heat exchange rate by electromagnetic induction heating for the jetting means.

In Patent Literature 2 is disclosed a tire vulcanizing machine wherein means necessary for agitation and heating of the aforesaid heating/pressurizing medium are disposed concentratedly within a utilizable space inside a green tire. This conventional tire vulcanizing machine has a turbine and an electric motor for operating the turbine. And the turbine, a rotor and a stator of the electric motor are accommodated within a sealed space into which the heating/pressurizing medium is supplied.

However, all of the above conventional techniques involve the problem that a marked temperature difference occurs between upper and lower portions of the green tire in the vulcanizing process and it obstructs the stabilization of the tire quality.

More particularly, the tire vulcanizing machine according to each of the above conventional techniques has a supply section for supplying the heating/pressurizing medium from a lower side and upper and lower gripping sections for grippingly holding upper and lower edge portions of the bladder respectively.

On the other hand, in such vulcanizing/molding using the heating/pressurizing medium as described above, a set temperature of the heating/pressurizing medium supplied to the interior of the bladder is usually set higher than a set temperature of the same medium after a temperature rise and also higher than the mold temperature after the temperature rise. This is for increasing the rate of temperature rise in an initial stage of vulcanization. When such a high-temperature heating/pressurizing medium is conducted from the lower portion of the vulcanizing machine to the supply section through a pipe or the like, the heat of the pipe or the like is transmitted particularly to the lower gripping section by heat conduction and then transmitted from the gripping section to a lower edge portion of the green tire. If a metallic contacting section adapted to come into contact with the lower edge portion of the green tire to support the lower edge portion is present between the lower gripping section and the green tire as described in Patent Literature 1, the aforesaid heat conduction to the lower edge portion of the green tire becomes more marked. Such unbalanced heat conduction to the lower edge portion side of the green tire contributes to increasing the temperature difference between upper and lower portions of the green tire during vulcanizing/molding. This causes the problem that the vulcanization proceeds more rapidly at the lower edge portion of the green tire, i.e., on the high temperature side, than at the upper edge portion of the green tire, i.e., on the low temperature side, resulting in production of a tire not uniform in the quality of material (that is, the vulcanization quantity differs between upper and lower portions), thus exerting a bad influence on the tire quality.

[Patent Literature 1] Japanese Patent Laid-Open No. 2005-22399

[Patent Literature 2] Japanese Patent Laid-Open No. Hei 07 (1995)-329066

DISCLOSURE OF INVENTION

In view of the above-mentioned problems it is an object of the present invention to provide a tire vulcanizing machine capable of preventing or suppressing the occurrence of a temperature difference between upper and lower portions of a green tire in a vulcanizing process and thereby stabilizing the tire quality. For this purpose, the tire vulcanizing machine of the present invention comprises a mold adapted to accommodate a green tire removably, a bladder capable of expansion and contraction and disposed inside the green tire, a jet section adapted to jet a heating/pressurizing medium for vulcanizing/molding the green tire to the interior of the bladder, thereby expanding the bladder to press the green tire against the mold, a medium supply path for supplying the heating/pressurizing medium to the jet section, a holding section for holding an edge portion of the bladder on the side close to the medium supply path within the mold, and a heat insulator disposed so as to suppress the conduction of heat from the heating/pressurizing medium, the heating/pressurizing medium being jetted from the jet section through the medium supply path, through the holding section to an edge portion of the tire on the holding section side.

BEST MODE FOR CARRYING OUT THE INVENTION

The best mode for carrying out the present invention will be described below with reference to the accompanying drawings.

Figure 1:
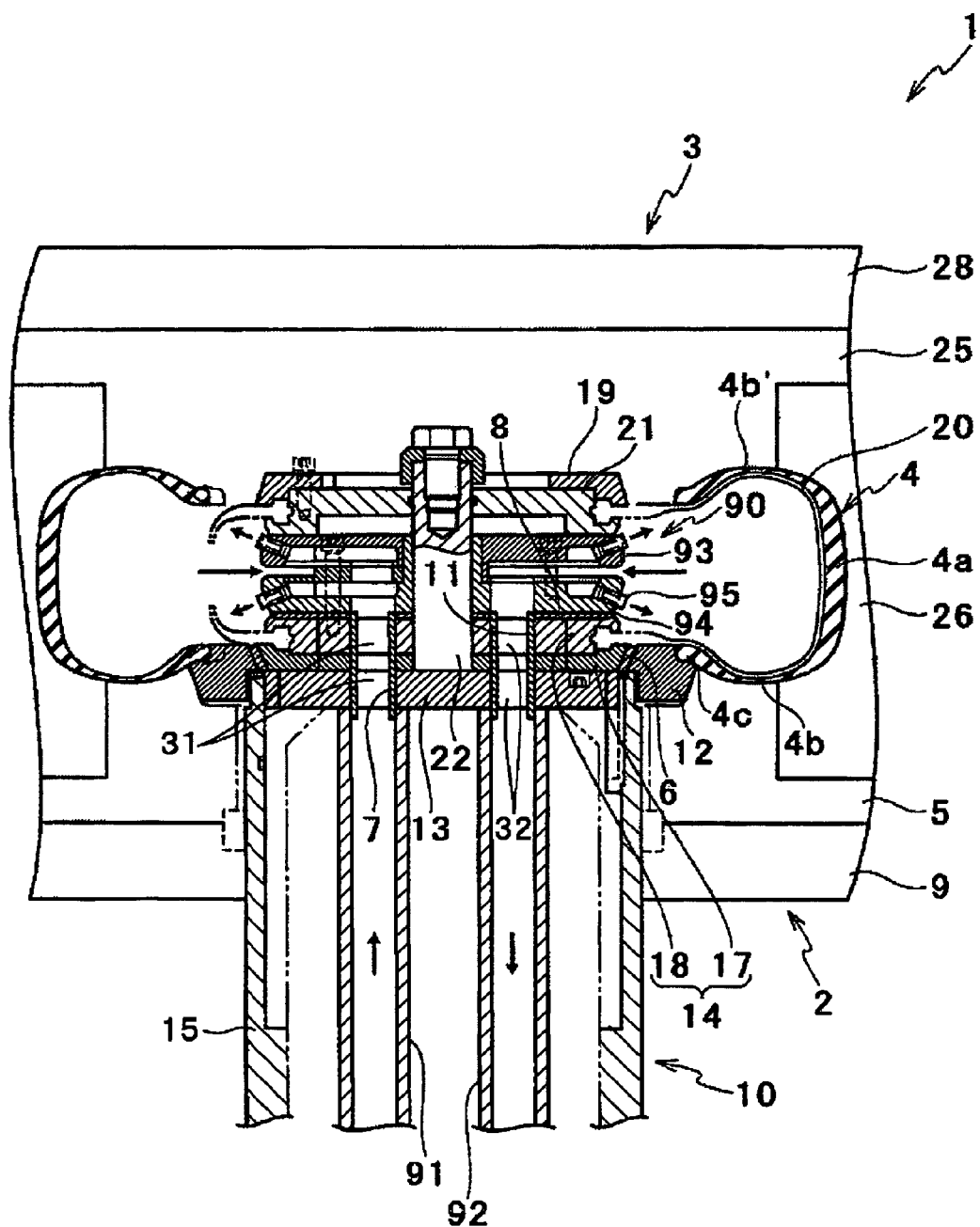
FIG. 1 is a schematic construction diagram showing a principal portion of a tire vulcanizing machine 1 according to an embodiment of the present invention.

FIG. 1 is a schematic construction diagram showing a principal portion of a tire vulcanizing machine 1 embodying the present invention. The tire vulcanizing machine 1 includes a mold for vulcanizing a green tire 4 and a bladder 20 disposed inside the green tire 4 to press the green tire 4 against the mold. The mold is provided for each of a mold fixing section 2 set at a predetermined height position and a mold lift section 3 adapted to move up and down with respect to the mold fixing section 2. The mold lift section 3 includes an upper-side mold 25 for coming into contact with an upper-side wall 4b' of the green tire 4, a split mold 26 positioned in an outer periphery direction of a tread portion 4a of the green tire 4, and an upper heating mechanism 28 for heating the upper-side mold 25 to a predetermined temperature. The upper-side mold 25 and the upper split mold 26 constitute an upper mold. On the other hand, the mold fixing section 2 includes a lower-side mold 5 for coming into contact with a lower-side wall 4b of the green tire 4, a lower heating mechanism 9 for heating the lower-side mold 5 to a predetermined temperature, a center mechanism 10 extending vertically through central portions of both lower heating mechanism 9 and lower-side mold 5, and a base plate (not shown) for supporting both center mechanism 10 and lower heating mechanism 9. The lower-side mold 5 constitutes a lower mold.

In FIG. 1, sections of the molds 25, 26 and 5 are not hatched for convenience' sake.

The center mechanism 10 includes a body pipe 15, a gripping section support member 13, a center post 22, a gripping section (holding section) 14 for holding an edge portion of the bladder 20, the edge portion being located on the side (i.e., lower side) close to a medium supply path to be described later, and plates 93 and 94.

The body pipe 15 extends vertically and an upper portion thereof extends through the central portions of both lower heating mechanism 9 and lower-side mold 5 of the molding fixing section 2. The gripping section support member 13 is fixed to the body pipe 15 so as to close an upper-end opening of the body pipe 15. The center post 22 extends vertically through the gripping section support member 13, is slidable vertically, and is disposed in an airtight state on the gripping section support member 13. An upper bead ring 19 is provided at an upper end portion of the center post 22 and an upper clamp ring 21 is positioned under the upper bead ring 19. The upper bead ring 19 and the upper clamp ring 21 hold grippingly an edge portion of the bladder 20, the edge portion being located on the side (upper side) opposite to a medium supply path to be described later.

To a lower end portion of the center post 22 is connected a post lift mechanism (not shown) which can move the center post 22 up and down to an arbitrary height position. The post lift mechanism moves the center post 22 up or down to expand or contract the bladder 20. More particularly, at the time of unloading of a vulcanized tire, the post lift mechanism causes the center post 22 to move up to an upper-limit position so as to lift an upper edge portion of the bladder 20 and make the diameter of the bladder smaller than that of a tire hole of the green tire 4. On the other hand, during vulcanizing/molding of the green tire 4, the post lift mechanism causes the center post 22 to move down so as to expand the bladder 20 up to a diameter permitting the contact with the bladder against an inner wall surface of the green tire 4.

The bladder 20 expands upon being supplied with high-temperature nitrogen gas as a heating/pressurizing medium at the time of vulcanizing/molding of the green tire 4 and thereby presses the inner wall surface of the green tire 4 in the mold direction. For example, the bladder 20 is formed of butyl rubber. As noted above, suitable examples of the heating/pressuring medium include steam and high-temperature gases (e.g., inert gas such as nitrogen, and air). In this embodiment nitrogen gas is exemplified as the heating/pressurizing medium.

A jet section 90 is provided in the interior of the bladder 20. The jet section 90 jets high-temperature nitrogen gas supplied from a gas supply unit (not shown) to the interior of the bladder 20, causing the bladder 20 to expand.

Figure 2A:
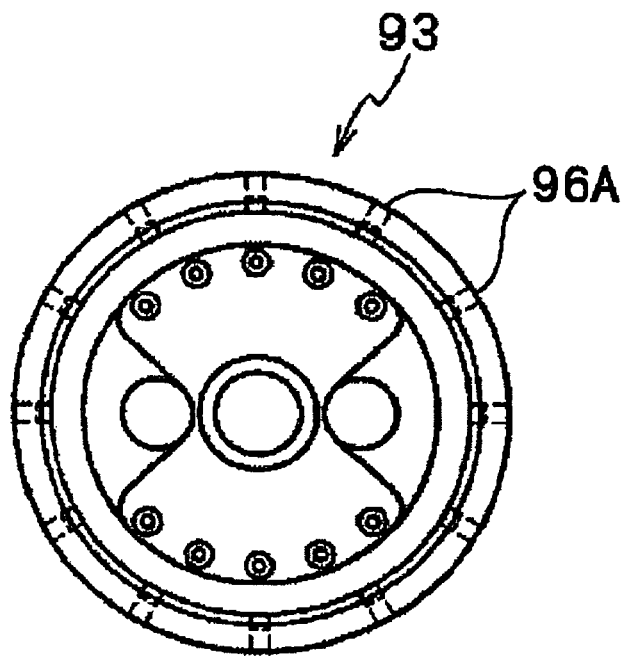
FIG. 2 is a plan view of a principal portion of a plate which constitutes a jet section shown in FIG. 1.
Figure 2B:
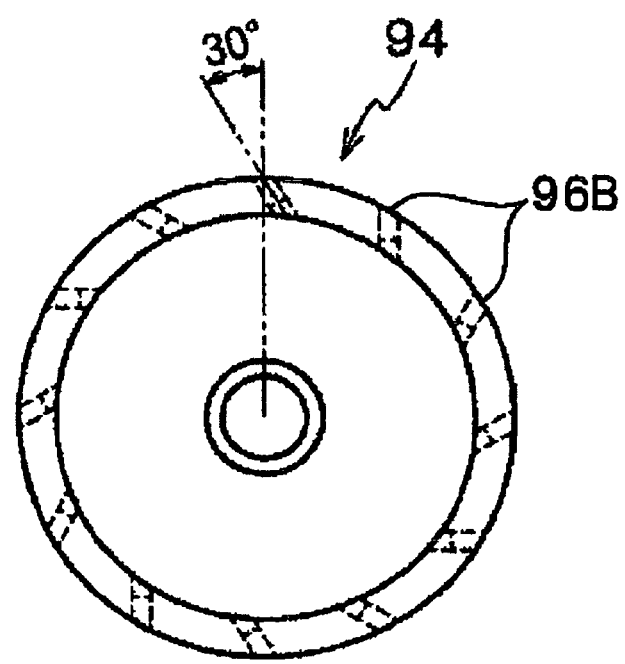

The jet section 90 includes hollow disc-like plates 93 and 94 which are shown also in FIGS. 2(a) and 2(b) and plural nozzles 95. The plates 93 and 94 are stacked vertically and plural nozzle mounting portions 96A and 96B are provided at circumferentially equal intervals on outer periphery portions of the plates 93 and 94 respectively. The nozzles 95 are secured to the nozzle mounting portions 96A and 96B respectively.

As shown in FIG. 2A, the nozzle mounting portions 96A of the plate 93 face in a direction matching the radial direction of the plate 93. On the other hand, as shown in FIG. 2B, the nozzle mounting portions 96B of the plate 94 may face in a direction inclined 30° from the direction matching the radial direction of the plate 93. This inclination is not limited to 30°, but may be set at any other angle.

As shown in FIG. 1, the jet section 90 is positioned centrally in the bladder 20. At the upper plate 93, each nozzle 95 is mounted outwards so as to face obliquely upwards, while at the lower plate 94, each nozzle 95 is mounted outwards so as to face obliquely downwards. Such an arrangement of the nozzles 95 makes it possible to jet high-temperature nitrogen gas uniformly in the circumferential direction from the nozzles 95, thereby heating the interior of the bladder 20 uniformly even without rotating the jet section 90 (that is, even with the jet section 90 fixed).

A medium supply path for the supply of high-temperature nitrogen gas to the jet section 90 from the lower side and a medium discharge path for the discharge of high-temperature nitrogen gas to the lower side from the interior of the bladder 20 are connected to the jet section 90. However, as noted above, rotation of the jet section 90 is unnecessary and this permit simplification of the structure for forming the above paths. As to this structure, a detailed description will be given later.

In the interior of the plate 93 and that of the plate 94 there are formed distribution passages respectively for distributing the high-temperature nitrogen gas supplied from the medium supply path to each nozzle 95.

The gripping section (holding section) 14 is provided between the jet section 90 and the gripping section support member 13. The gripping section 14, which is for holding a lower edge portion of the bladder 20 grippingly, is composed of an upper gripping member 18 which is a lower clamp ring and a lower gripping member 17 which is a lower bead ring. The gripping members 18 and 17 hold the lower edge portion of the bladder 20 grippingly from above and below.

A contacting section 12 formed of a lower ring is disposed at a radially outward position of the lower gripping member 18 in the gripping section 14. The contacting section 12 is fixed to the upper end of the body pipe 15 and is interposed between the lower gripping member 18 and the green tire 4. The contacting section 12 comes into contact with a lower bead portion 4c as a lower edge portion of the green tire 4 and thereby supports the lower bead portion 4c.

The following description is now provided about the structure for forming the aforesaid medium supply path and medium discharge path.

A gas supply pipe 91 and a gas discharge pipe 92 are provided inside the body pipe 15. On the other hand, in the gripping section support member 13 and the gripping section 14 there are formed a medium supply hole 31 and a medium discharge hole 32 so as to extend vertically through the support member 13 and the gripping section 14.

In this embodiment, the medium supply path is constituted by both the interior space of the gas supply pipe 91 and the medium supply hole 31. The gas supply pipe 91, as well as the gripping section support member 13 and the gripping section 14, correspond to constituent members of the medium supply path. More specifically, the medium supply hole 31 is formed in a position connected with gas supplying flow paths formed in the plates 93 and 94 (i.e., flow paths connected with the nozzles 95) and an upper end of the gas supply pipe 91 is joined to a lower surface of the gripping section support member 13 from below so that the medium supply hole 31 and the interior space of the gas supply pipe 91 are connected with each other.

Likewise, in this embodiment, the medium discharge path is constituted by both the interior space of the gas discharge pipe 92 and the medium discharge hole 32. The gas discharge pipe 92, as well as the gripping section support member 13 and the gripping section 14, correspond to constituent members of the medium discharge path. More specifically, the medium discharge hole 32 is formed in a position connected with gas discharging flow paths formed in the plates 93 and 94 (i.e., flow paths communicating with the interior of the bladder 20) and an upper end of the gas discharge pipe 92 is joined to the lower surface of the gripping section support member 13 from below so that the medium discharge hole 32 and the interior space of the gas discharge pipe 92 are connected with each other.

In the tire vulcanizing machine 1, moreover, a supply-side heat insulator 7, a discharge-side heat insulator 11, a jet section-side heat insulator 8 and a contacting section-side heat insulator 6 are provided as heat insulators for preventing or suppressing the occurrence of a temperature difference between upper and lower portions of the green tire 4 in a vulcanizing process to be described later. The heat insulators 7, 11, 8 and 6 are formed of a heat insulating material low in heat conductivity. Preferred examples are glass wool (glass fiber), rock wool, and alumina fiber.

The supply-side heat insulator 7 is provided between the lower gripping section 14, as well as the gripping section support member 13, and the medium supply path formed by them, thereby preventing or suppressing the transfer of heat from the high-temperature nitrogen gas flowing through the medium supply path to the gripping section 14 and the gripping section support member 13. More specifically, the first insulator 7 related to this embodiment is in a tubular shape which covers from the inside an inner periphery surface of the gripping section 14 and that of the gripping section support member 13 both surrounding the medium supply hole 31. Its length and thickness can be changed appropriately. The supply-side heat insulator 7 need not always be provided on the gripping section support member 13 side insofar as it is at least interposed between the gripping section 14 and the medium supply path. The gripping section support member 13 may be omitted, depending on the specification.

The discharge-side heat insulator 11 is provided between the gripping section 14, as well as the gripping section support member 13, and the medium discharge path formed by them, thereby preventing or suppressing the transfer of heat from discharge gas flowing through the medium discharge path to the gripping section 14 and the gripping section support member 13. More specifically, the discharge-side heat insulator 11 related to this embodiment is in a tubular shape which covers from the inside the inner periphery surface of the gripping section 14 and that of the gripping section support member 13 both surrounding the medium discharge hole 32. Its length and thickness can be changed appropriately.

The jet section-side heat insulator 8 is provided between the jet section 90 and the lower gripping section 14 to prevent or suppress the transfer of heat from the jet section 90 to the gripping section 14. More specifically, the jet section-side heat insulator 8 related to this embodiment is in the shape of a sheet sandwiched in between the lower plate 94 and the upper gripping member 18. Its area and thickness can be changed appropriately. The jet section-side heat insulator 8 and at least one of the supply-side heat insulator 7 and the discharge-side heat insulator 8 can be formed so as to be continuous with each other. Such a forming makes a further improvement of the heat insulating effect.

The contacting section-side heat insulator 6 is provided between the gripping section 14 and the contacting section 12 to prevent or suppress the transfer of heat from the gripping section 14 to the contacting section 12. More specifically, the contacting section-side heat insulator 6 related to this embodiment is in an annular shape sandwiched in between the lower gripping member 17 of the gripping section 14 and the contacting section 12, but its shape and thickness can be changed appropriately. Since the contacting section-side heat insulator 6 shown in Figure has a shape increasing in diameter upwards, there is no fear of its disengagement together with the bladder 20 at the time of removing the bladder 20.

The operation of the tire vulcanizing machine 1 will be described below.

First, the green tire 4 is accommodated within the mold formed of the lower-side mold 5, split mold 26 and upper-side mold 25. The bladder 20 is disposed inside the green tire 4. Then, high-temperature nitrogen gas is supplied to the interior of the bladder 20 through the medium supply path and the jet section 90. At this time, the rate of temperature rise is increased in an initial stage of vulcanization to shorten the vulcanization time for the green tire 4. Specifically, the temperature of the nitrogen gas supplied is set higher than a set temperature of nitrogen gas after temperature rise.

Without the heat insulators 7, 11, 8 and 6, the temperature difference between the upper and lower bead portions of the green tire 4 would become larger because of following reasons. Since inner periphery surfaces of the lower gripping section 14 and the gripping section support member 13 both surrounding the medium supply hole 31 and the medium discharge hole 32 are exposed directly to the high-temperature nitrogen gas flowing through the medium supply holes 31 and 32, particularly the temperature of the lower gripping section 14 and that of the gripping section support member 13 rise to a remarkable extent. Further, the jet section 90 adapted to jet the high-temperature nitrogen gas is most likely to be exposed to a high temperature, and the heat of the jet section 90 is also transmitted to the gripping section 14. The heat of the thus-heated gripping section 14 is transmitted to the contacting section 12 and further transmitted to the lower bead portion 4c of the green tire 4 which is contacted with the contacting section 12. On the other hand, it is only the heat of nitrogen gas provided from the jet section 90 that is transmitted to the upper gripping section (the upper clamp ring 21 located at a vertically symmetric position with respect to the upper gripping member 18) with the green tire 4 as a boundary. Consequently, the upper clamp ring 21 is lower in temperature than the upper gripping member 18 (lower clamp ring).

As the temperature difference between the upper and lower bead portions of the green tire 4 increases in this way, there is produced a tire wherein the vulcanization quantity is different between upper and lower portions. That is, the tire quality is affected. However, in the tire vulcanizing machine 1 of this embodiment, the heat insulating effect attained by the heat insulators 7, 11, 8 and 6 prevents or suppresses the rise in temperature of the lower gripping section 14 and further the contacting section 12. That is, it is possible to prevent or suppress the occurrence of a temperature difference between upper and lower bead portions of the green tire 4 in the vulcanizing process. Consequently, it is possible to prevent or suppress the occurrence of a difference in vulcanization quantity between upper and lower portions of the tire, whereby the tire quality can be stabilized. Particularly, the contacting section-side heat insulator 6 positioned between the lower gripping section 14 and the contacting section 12 is highly effective in preventing or suppressing the rise in temperature of the contacting section 12. The temperature rise preventing or suppressing effect can be attained even by only heat-insulating with the first heat insulator 7 between the gas supply pipe 91 as a basic element for the supply of high-temperature nitrogen gas to the interior of the bladder 20 and the gripping section 14.

On the other hand, if the temperature of nitrogen gas is raised to a high level in an initial stage of vulcanization, the heat of the high-temperature nitrogen gas supplied to the interior of the bladder 20 is used for heating the metal members forming the plates 93 and 94 in the jet section 90, the upper gripping member 18, lower gripping member 17 and contacting section 12 rather than being transmitted to the inner surface of the green tire 4, thus giving rise to the problem that the quantity of heat effective in heating the green tire 4 which is the intended object decreases.

However, according to the tire vulcanizing machine 1 of this embodiment, owing to the heat insulating effect of the heat insulators 7, 11, 8 and 6, the aforesaid heat of nitrogen gas is prevented or effectively suppressed from being absorbed by the gripping section 14, gripping section support member 13 and contacting section 12. For example, if the temperature of each constituent is presumed in consideration of heat conduction, the temperature of the upper gripping member 18 is not lower than 200° C. on condition that the temperature of each of the plates 93 and 94 is 210° C. and that the jet section-side heat insulator 8 is not installed. However, installation of the jet section-side heat insulator 8 having a thickness of 1 mm causes a drop in temperature of the upper gripping member 18 to about 172° C. Moreover, it is presumed that installation of the heating insulators 7, 11, 8 and 6 results in reduction of the total radiated heat quantity to one-twentieth to one-thirtieth as compared with the case where those heat insulators are not installed. This also leads to keeping the capacity of a heater for generating the high-temperature nitrogen gas and that of a blower or the like for supply of the same gas to a minimum level required.

Further, in this embodiment, since the gas supply pipe 91 and the gas discharge pipe 92 as portions not covered with a heat insulator out of the constituents forming the medium supply path and the medium discharge path are both covered with the body pipe 15, diffusion of the heat of the heating/pressurizing medium from the surfaces of the gas supply pipe 91 and gas discharge pipe 92 to the exterior of the system is also prevented.

The gripping section 14 and the gripping section support member 13 need not always be included in the constituents of the medium supply path and the medium discharge path. For example, the gas supply pipe 91 and the gas discharge pipe 92 both shown in FIG. 1 may be connected directly to the jet section 90, and the gripping section 14 and the gripping section support member 13 may be spaced apart from the pipes 91 and 92. Also in this case, interposition of a supply-side heat insulator or a discharge-side heat insulator between the gas supply pipe 91 or the gas discharge pipe 92 and at least the gripping section 14 prevents or suppresses the rise in temperature of the gripping section 14 caused by the transfer of heat from the high-temperature heating/pressurizing medium to the gripping section 14.

The present invention is not limited to include the contacting section 12. Even in the absence of the contacting section 12, the transfer of heat from the heating/pressurizing medium, which is supplied from below to the jet section 90 shown in FIG. 1, to the lower gripping section 14 is suppressed by the supply-side heat insulator 7, the discharge-side heat insulator 11, or the jet section-side heat insulator 8, and thereby prevents or effectively suppresses the generation of a temperature gradient in the green tire which is attributable to the transfer of heat from the gripping section 14 to the lower edge portion of the green tire.

In the present invention, the supply of the heating/pressurizing medium to the jet section 9 is not limited to from below. The heating/pressurizing medium may be supplied from above. In this case, an upper edge portion of the green tire 4 is more likely to undergo the heat of the heating/pressurizing medium and rise in temperature than the lower edge portion of the tire. Therefore, disposing the supply-side heat insulator and discharge-side heat insulator or the jet section-side heat insulator so as to suppress the transfer of the heat of the heating/pressurizing medium to the upper bead ring 19 and the upper clamp ring 21 both constituting the upper gripping section, is effective in suppressing the occurrence of a temperature difference between upper and lower portions of the green tire 4. In the case where a contacting section for coming into contact with the upper edge portion of the green tire is interposed between the upper holding section and the green tire, it is also effective to interpose a contacting section-side heat insulator between the contacting section and the upper holding section.

In the apparatus shown in FIGS. 1 and 2, it is preferable that a sectional area of the flow path formed by the gas supply pipe 91 as a medium inlet pipe connected to the jet section 90 and the total sum of outlet sectional areas of all the nozzles 95 be almost equal to each other. It is also preferable that a vertical spacing between the plates 93 and 94 be large. These points permit a great decrease in pressure loss of the heating/pressurizing medium in the interior of the jet section 90. Particularly, if the vertical spacing between the plates 93 and 94 is widened, the sectional area of the gas outlet flow path sandwiched in between the plates 93 and 94 is enlarged and the pressure loss in the gas outlet flow path decreases to a remarkable extent.

For example, in the case where nozzles 95 inclined 30° vertically relative the radial direction are disposed in the upper and lower plates 93 and 94, an inside diameter of the gas supply pipe 91 as a gas inlet pipe is 38 mm, and an outlet diameter of each nozzle 95 is 8 mm, if the spacing between the plates 93 and 94 is enlarged from 6 mm to 12 mm, a pressure loss $\Delta P$ in the gas outlet flow path sandwiched in between both plates 93 and 94 proved to decrease from 68 kPa to 55 kPa.

In the present invention, various changes may be made within the scope of the appended claims.

Thus, according to the present invention there can be provided a tire vulcanizing machine capable of stabilize the quality of a tire. Specifically, the tire vulcanizing machine according to the present invention comprises a mold adapted to accommodate a green tire removably, a bladder capable of expansion and contraction and disposed inside the green tire, a jet section adapted to jet a heating/pressurizing medium for vulcanizing/molding the green tire to the interior of the bladder, thereby expanding the bladder to press the green tire against the mold, a medium supply path for supplying the heating/pressurizing medium to the jet section, a holding section for holding an edge portion of the bladder on the side close to the medium supply path within the mold, and a heat insulator disposed so as to suppress the conduction of heat from the heating/pressurizing medium, the heating/pressurizing medium being jetted from the jet section through the medium supply path, through the holding section to an edge portion of the green tire on the holding section side.

The heat insulating effect of the heat insulators makes it possible to prevent or suppress unbalanced heat conduction from a high-temperature heating/pressurizing medium to an edge portion of a green tire through the holding section on the medium supply path side. That is, it is possible to prevent or suppress the occurrence of a temperature difference between upper and lower portions of a green tire in the vulcanizing process using the tire vulcanizing machine. Consequently, it is possible to prevent or suppress the vulcanization quantity from becoming different between upper and lower portions of the tire and hence possible to make the material quality of the tire uniform. That is, the quality of the tire can be stabilized. Moreover, since the heat of the heating/pressurizing medium can be prevented from being deprived of to excess for example by the holding section, the capacity of a heater for generating the heating/pressurizing medium and that of a blower or the like for supply of the same medium can be kept as low as a minimum level required.

Specifically, it is preferable that the heat insulator be disposed so as to suppress the transfer of heat from the heating/pressurizing medium to the holding section. The holding section is particularly apt to receive the heat of the heating/pressurizing medium and is positioned close to one edge portion of the green tire. Therefore, suppressing the transfer of heat to the holding section is effective in preventing or suppressing unbalanced conduction of the heat to the above edge portion of the green tire.

More particularly, it is preferable that the heat insulator includes a supply-side heat insulator interposed between the medium supply path and the holding section. This supply-side heat insulator prevents or effectively suppresses the transfer of the heat of the high-temperature heating/pressurizing medium which is supplied to the jet section, to the holding section.

In the case where the holding section has an inner periphery surface surrounding a medium supply hole, the medium supply hole constituting the medium supply path, it is preferable that the supply-side heat insulator has a tubular portion disposed so as to cover the inner periphery surface of the holding section from inside. Though the supply-side heat insulator is simple in structure, the supply-side heat insulator effectively prevents the transfer of heat from the heating/pressurizing medium flowing through the medium supply path to the inner periphery surface of the holding section.

Likewise, in the case where the tire vulcanizing machine includes a medium discharge path for discharging the heating/pressurizing medium from the interior of the bladder to the same side as the medium supply path, it is preferable that the heat insulator includes a discharge-side heat insulator interposed between the medium discharge path and the holding section. This discharge-side heat insulator prevents or effectively suppresses the transfer of the heat of the high-temperature heating/pressurizing medium which is discharged from the bladder, to the holding section.

In the case where the holding section has an inner periphery surface surrounding a medium discharge hole, the medium discharge hole constituting the medium discharge path, it is preferable that the discharge-side heat insulator has a tubular portion disposed so as to cover the inner periphery surface of the holding section from inside. Though this discharge-side heat insulator is simple in structure, the discharge-side heat insulator effectively prevents the transfer of heat from the heating/pressurizing medium flowing through the medium discharge path to the inner periphery surface of the holding section.

A jet section-side heat insulator interposed between the jet section and the holding section is also effective as one of the heat insulators. This jet section-side heat insulator can effectively prevent the transfer of the heat of the jet section, whose temperature is raised by the high-temperature heating/pressurizing medium, to the holding section located on the medium supply path side.

If the jet section-side heat insulator is continuous with the supply-side heat insulator or the discharge-side heat insulator, the jet section-side heat insulator exhibits a further excellent heat insulating effect. Making the jet section-side heat insulator continuous with the supply-side heat insulator and the discharge-side heat insulator permits not only reducing the number of parts required of all the heat insulators but also effectively cutting-off the leakage of heat from the heating/pressurizing medium to the holding section side.

Further, it is particularly effective for the vulcanizing machine of the present invention to further include a contacting section disposed between the holding section and the green tire and supporting the edge portion in the state that the edge portion comes into contact with an edge portion of the green tire, the edge portion being located on the medium supply path side. This contacting section can serve as a heat conduction medium or heat transfer path from the holding section to the green tire. Therefore, as noted above, including a heat insulator which prevents or suppresses the transfer of the heat of the heating/pressurizing medium to the holding section or a contacting section-side heat insulator interposed between the holding section and the contacting section, effectively prevents the direct transfer of heat from the contacting section to the edge portion of the green tire which is in contact with the contacting section.

The invention claimed is:
1. A tire vulcanizing machine for vulcanizing a green tire, comprising:
   a mold adapted to accommodate a green tire removably;
   a bladder capable of expansion and contraction and disposed inside the green tire, said bladder having an interior side exposed to a heating/pressurizing medium;
   a jet section adapted to jet said heating/pressurizing medium for vulcanizing/molding of the green tire to the interior of said bladder, thereby expanding said bladder to press the green tire against said mold;
   a medium supply path for supplying the heating/pressurizing medium to said jet section;
   the heating/pressurizing medium being jetted from said jet section into said bladder and having a portion of said heating/pressurizing medium contacted against said interior of said bladder,
   a holding section for holding an edge portion of said bladder on the interior side of said bladder adjacent to said medium supply path; and
   a heat insulator disposed so as to suppress the conduction of heat from the heating/pressurizing medium to the holding section, said heat insulator having a jet section-side portion positioned between a portion of the jet section and a portion of the holding section, the heating/pressurizing medium jetted from said jet section through said medium supply path across a portion of said holding section and providing heat for an edge portion of the green tire.

2. The tire vulcanizing machine according to claim 1, wherein
said heat insulator comprises a supply-side heat insulator portion which is interposed between said medium supply path and said holding section.

3. The tire vulcanizing machine according to claim 2, wherein
said holding section has an inner periphery surface surrounding a medium supply hole, said medium supply path comprising said medium supply hole and said supply-side heat insulator portion, and
said supply-side heat insulator portion has a tubular portion disposed so as to cover said inner periphery surface of said holding section from inside.

4. The tire vulcanizing machine according to claim 1, further comprising:
a medium discharge path for discharging the heating/pressurizing medium from the interior of said bladder, wherein
said heat insulator comprises a discharge-side heat insulator portion which is interposed between said medium discharge path and said holding section.

5. The tire vulcanizing machine according to claim 4, wherein
said holding section has an inner periphery surface surrounding a medium discharge hole, said medium discharge path comprising said medium discharge hole and said discharge-side heat insulator portion, and
said discharge-side heat insulator portion has a tubular portion disposed so as to cover said inner periphery surface of said holding section from inside.

6. The tire vulcanizing machine according to claim 2, wherein said jet section-side insulator portion and said supply-side heat insulator portion are continuous with each other.

7. The tire vulcanizing machine according to claim 4, wherein
said jet section-side heat insulator portion and said discharge-side heat insulator portion are continuous with each other.

8. The tire vulcanizing machine according to claim 1, further comprising:
a contacting section disposed between said holding section and the green tire and adapted to come into contact with said edge portion of the green tire.

9. The tire vulcanizing machine according to claim 8, wherein
said heat insulator comprises a contacting section-side heat insulator portion interposed between said holding section and said contacting section.

* * * * *